(12) United States Patent
Kamal et al.

(10) Patent No.: US 8,063,732 B2
(45) Date of Patent: Nov. 22, 2011

(54) ELECTRICAL RESISTOR STRUCTURE

(75) Inventors: Abdallah Kamal, Chateau Gontier (FR); Michael Ott, Ampoigne (FR)

(73) Assignee: MCB Industrie, Argenteuil (FR)

( * ) Notice: Subject to any disclaimer, the term of this patent is extended or adjusted under 35 U.S.C. 154(b) by 83 days.

(21) Appl. No.: 12/667,448

(22) PCT Filed: Jul. 3, 2008

(86) PCT No.: PCT/FR2008/051241
§ 371 (c)(1),
(2), (4) Date: Apr. 15, 2010

(87) PCT Pub. No.: WO2009/007656
PCT Pub. Date: Jan. 15, 2009

(65) Prior Publication Data
US 2010/0194523 A1    Aug. 5, 2010

(30) Foreign Application Priority Data

Jul. 3, 2007  (FR) ...................................... 07 56247

(51) Int. Cl.
*H01C 3/00* (2006.01)
*H01C 7/00* (2006.01)
(52) U.S. Cl. .......... 338/333; 338/51; 338/315; 123/549; 219/206

(58) Field of Classification Search ............... 338/333, 338/334, 51–52, 295, 315, 318, 319; 123/549, 123/556, 505; 219/206
See application file for complete search history.

(56) References Cited

U.S. PATENT DOCUMENTS

| 4,079,233 | A  | * | 3/1978  | Meywald ...................... 338/290 |
| 5,917,404 | A  | * | 6/1999  | Campbell ..................... 338/315 |
| 6,073,615 | A  |   | 6/2000  | Anderson et al. |
| 6,329,900 | B1 | * | 12/2001 | Everett ......................... 338/316 |
| 6,917,278 | B1 | * | 7/2005  | Everitt ......................... 338/280 |
| 2004/0118388 | A1 | | 6/2004 | Geiger et al. |

OTHER PUBLICATIONS

International Search Report dated Mar. 3, 2009 from corresponding PCT application.

* cited by examiner

*Primary Examiner* — Kyung Lee
(74) *Attorney, Agent, or Firm* — Young & Thompson

(57) ABSTRACT

This electrical resistor structure which includes a frame (2) for receiving elements which form an electrical resistor (3) in the form of a serpentine resistive element, the folded ends of the branches of which are associated with elements (8, 9) for fixing to opposing cross-members (5, 6) of the frame, is characterised in that the fixing elements include elements which form spacing members (12) which are fixed to the cross-members of the frame and which are provided with projecting portions which are spaced-apart from each other and which together define zones for receiving, by clamping and with axial clearance, at least a part of the corresponding ends of the resistive element (3).

6 Claims, 3 Drawing Sheets

ELECTRICAL RESISTOR STRUCTURE

The present invention relates to an electrical resistor structure. More specifically, the invention relates to an electrical resistor structure of the type comprising:
- an electrical resistor which forms a band which is folded in a serpentine manner so that the band comprises rectilinear portions which extend in a longitudinal direction of the electrical resistor, and portions which are curved in a U-shaped manner and which comprise two branches, the two branches being spaced-apart from each other by a distance D1,
- a frame comprising cross-members, and
- means for fixing the electrical resistor, the fixing means being fixed to two opposing cross-members, the fixing means comprising spacing members which are provided with projections which are spaced-apart from each other and which together define zones for receiving at least a part of the curved portions, by means of clamping and with a clearance in the longitudinal direction.

Structures of this type, which are known in the prior art, have a given number of disadvantages in particular in terms of the expansion of the branches of the resistive element.

It is difficult for the fixing means used up to the present time to take up the variations in length of the branches connected with the variations in temperature of the resistive element.

The object of the invention is therefore to overcome these problems.

To this end, the invention relates to a structure of the above-mentioned type, each branch of each curved portion of which comprises a zone which is shaped so that the spacing D2 between the shaped zones of two branches of the same curved portion is reduced relative to the spacing D1 between the main faces of the two branches, the shaped zone being produced without any cuts or weld seams, the shaped zones being capable of engaging between the projections of the spacing members.

According to other features:
- guiding flaps extend at one side and the other of the spacing members;
- the projections of the spacing members are formed by studs;
- the spacing members are fixed to the cross-members by means of screw/nut systems; and
- the spacing members are produced from ceramic material.

Figure 1:
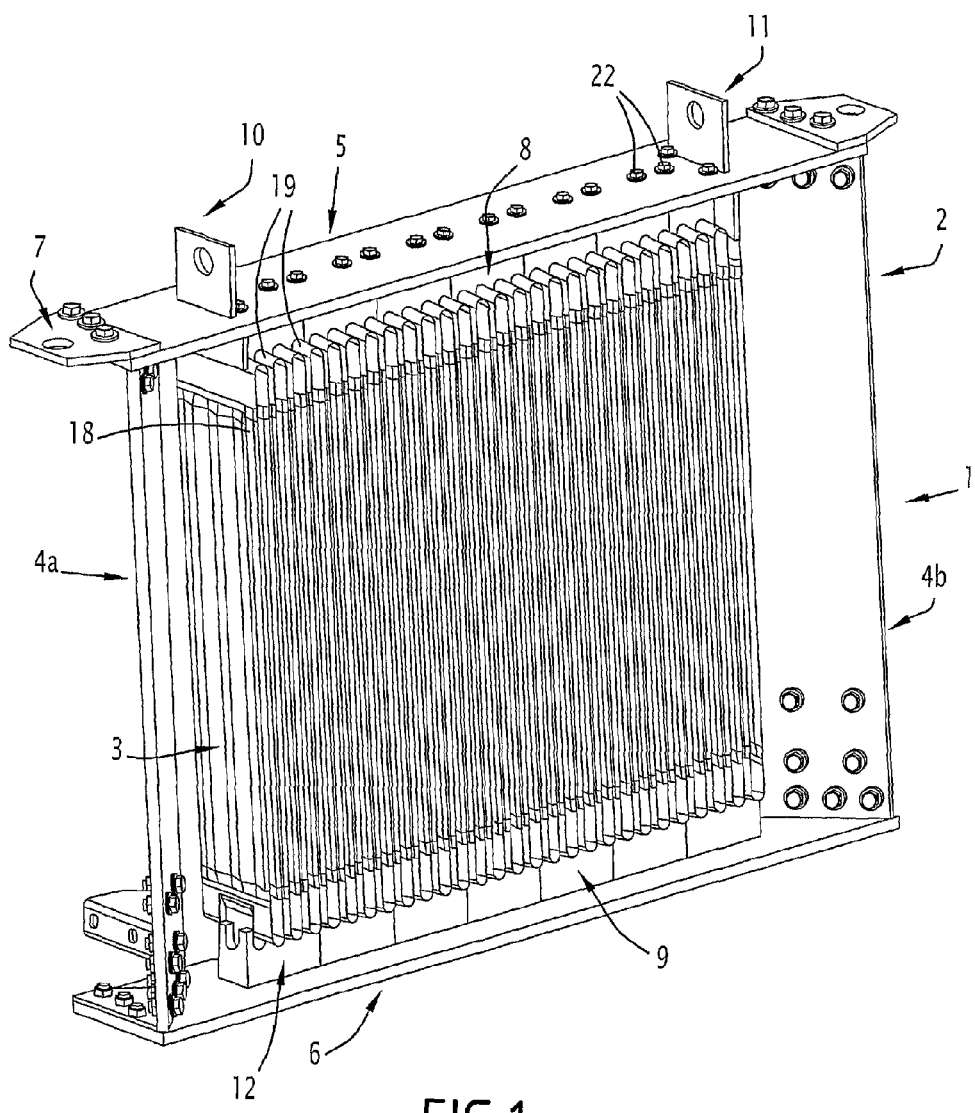
Figure 2:
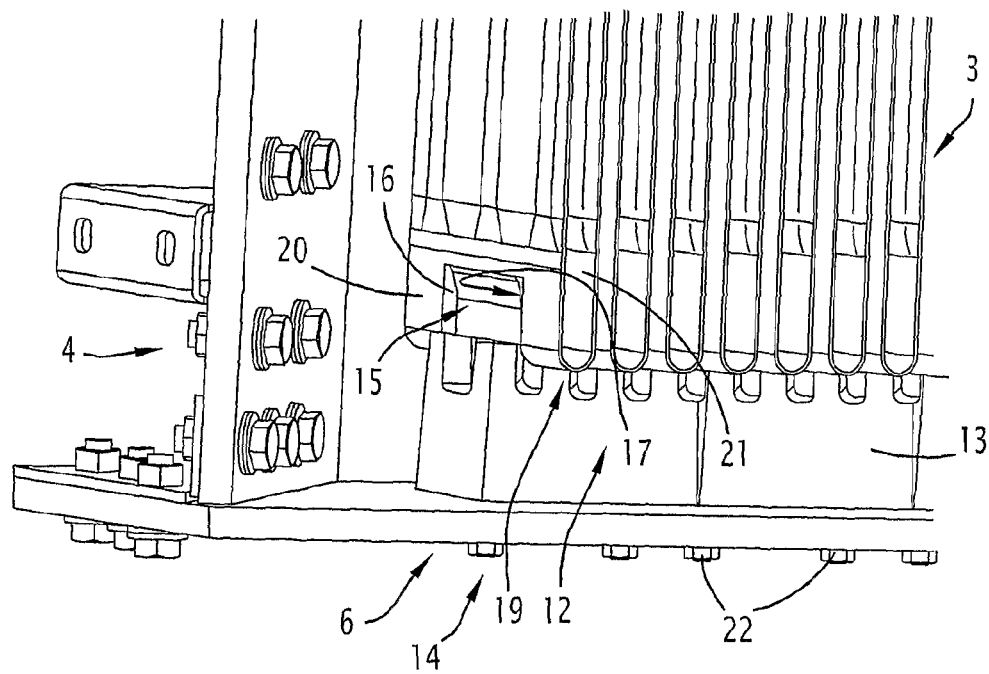
Figure 3:
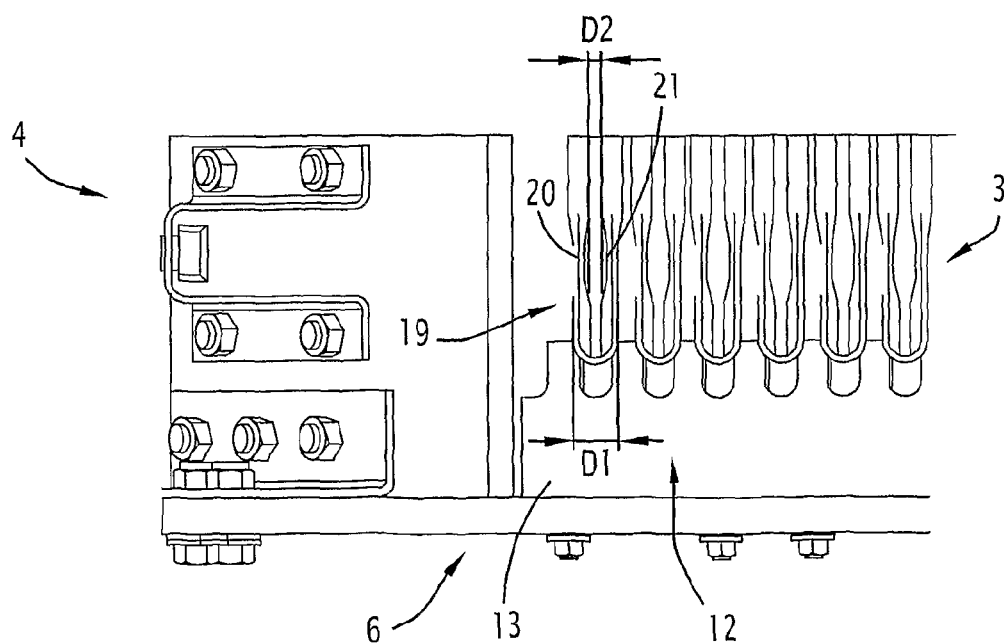
Figure 4:
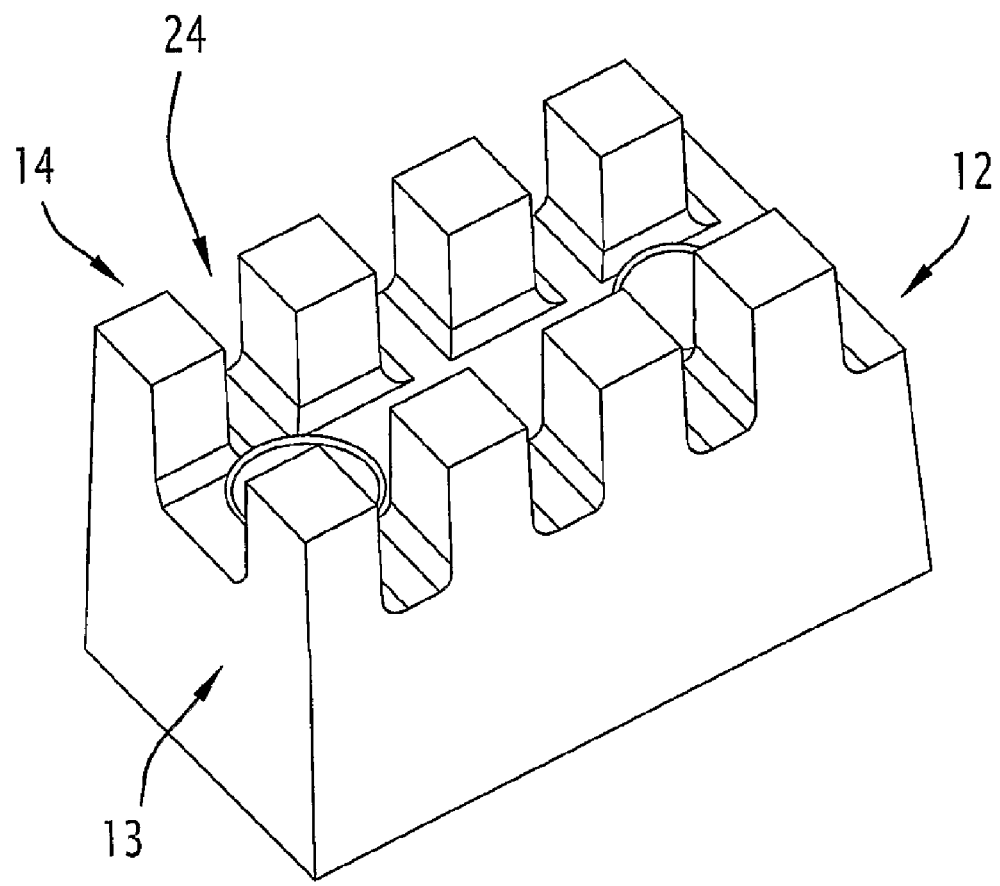

The invention will be better understood from a reading of the following description given purely by way of example and with reference to the appended drawings, in which:

FIG. 1 is a perspective view of an electrical resistor structure according to the invention, FIGS. 2 and 3 are detailed views of this structure, and FIG. 4 is a perspective view of means which form a spacing member involved in the constitution of such a structure.

These Figures, and in particular FIG. 1, illustrate an electrical resistor structure 1 which comprises a frame 2 for receiving means which form an electrical resistor 3.

The frame is formed, for example, by two columns, which are generally designated 4a and 4b and at the ends of which cross-members 5 and 6 are provided, respectively.

The frame also comprises in conventional manner, for example, in each corner, means, such as, for example, 7, for fixing to any adjacent structure.

These fixing means comprise, for example, metal fittings.

The means which form the electrical resistor 3 are in the form of a resistive band which is folded in a serpentine manner.

The band comprises rectilinear portions 18, which extend in a longitudinal direction of the electrical resistor 3, and curved portions 19. The rectilinear portions 18 are parallel with each other. Each curved portion 19 is arranged between two rectilinear portions 18. Each curved portion 19 is U-shaped with two branches 20, 21 whose main faces are separated from each other by a distance D1.

The curved portions 19 are associated with fixing means 8, 9 on the opposing cross-members 5 and 6 of the frame. The resistor is produced in one piece without any welding.

The two terminal ends of the resistive element themselves comprise terminals 10 and 11 for connection to the remainder of the electrical circuits, respectively.

As has been set out above, the invention relates to a specific structure which uses fixing means 8, 9 which are capable of allowing absorption of the variations in length of the resistive element owing to temperature variations thereof.

These fixing means 8, 9 comprise, as can be seen more clearly in FIGS. 2, 3 and 4, means which form spacing members which are, for example, in the form of bricks 12.

These means which form a spacing member or brick 12 comprise a base 13 which allows it to be fixed to the corresponding cross-member of the frame by means of, for example, of holes and screw/nut means 22.

This base is provided with protruding portions or studs 14 which are regularly distributed on the means which form a spacing member in order to define together zones 24 for receiving parts of the curved portions 19 of the resistive element by means of clamping and with longitudinal clearance.

In this manner, for example, as can be seen in FIGS. 2 and 3, the two branches 20, 21 of each curved portion comprise a zone 15 which is shaped so that the spacing D2 between two shaped zones 15 of a curved portion is reduced relative to the spacing D1 between the two main faces of the two branches 20, 21 of the same curved portion. The shaped zones 15 of two branches of a curved portion 19 are capable of engaging between the projections 14 of the spacing members at one side and the other of the receiving zone.

Guiding flaps 16 and 17 are formed at one side and the other of the shaped zone 15. The guiding flaps 16 and 17 extend at one side and the other of the means which form a spacing member.

It may be considered that such a structure therefore allows the resistor to be received in the frame with the possibility of absorbing the variations in length of the branches of the resistive element. Such a structure is produced without any cuts or weld seams in order to prevent any local concentration of electric current.

It should be noted, for example, that the means which form a spacing member can be produced from ceramic material or the like in order to provide electrical insulation for the resistive component.

Of course, different embodiments of these fixing means and the corresponding end zones of the resistive element may be envisaged.

The invention claimed is:

1. Electrical resistor structure comprising:
   an electrical resistor (3) which forms a band which is folded in a serpentine manner so that the band comprises rectilinear portions (18) which extend in a longitudinal direction of the electrical resistor (3), and portions (19) which are curved in a U-shaped manner and which comprise two branches (20, 21), the two branches (20, 21) being spaced-apart from each other by a distance (D1),
   a frame (2) comprising cross-members, and means (8, 9) for fixing the electrical resistor (3), the fixing means (8, 9, 12, 14, 24) being fixed to two opposing cross-members (5, 6), the fixing means (8, 9, 12, 14, 24) comprising spacing members (12) which are provided with projections (14) which are spaced-apart from each other and which together define zones (24) for receiving at least a part of the curved portions (19), by means of clamping and with a clearance in the longitudinal direction, characterised in that each branch (20, 21) of each curved portion (19) comprises a zone (15) which is shaped so that the spacing (D2) between the shaped zones (15) of two branches (20, 21) of the same curved portion (19) is reduced relative to the spacing (D1) between the main faces of the two branches (20, 21), the shaped zone (15) being produced without any cuts or weld seams, the shaped zones (15) being capable of engaging between the projections (14) of the spacing members.

2. Electrical resistor structure according to claim 1, characterised in that the structure comprises guiding flaps (16, 17) which extend at one side and the other of the spacing members (12).

3. Electrical resistor structure according to claim 1, characterised in that the projections (14) of the spacing members (12) are formed by studs (14).

4. Electrical resistor structure according to claim 1, characterised in that the spacing members (12) are fixed to the cross-members (5, 6) by means of screw/nut systems.

5. Electrical resistor structure according to claim 1, characterised in that the spacing members (12) are produced from ceramic material.

6. Electrical resistor structure according to claim 2, characterised in that the projections (14) of the spacing members (12) are formed by studs (14).

\* \* \* \* \*